United States Patent [19]

Dickens, Jr.

[11] 4,234,472
[45] Nov. 18, 1980

[54] SMOKE RETARDANT VINYL CHLORIDE AND VINYLIDENE CHLORIDE POLYMER COMPOSITIONS

[75] Inventor: Elmer D. Dickens, Jr., Richfield, Ohio

[73] Assignee: The B. F. Goodrich Company, Akron, Ohio

[21] Appl. No.: 16,582

[22] Filed: Mar. 1, 1979

[51] Int. Cl.³ ............................................. C08K 3/22
[52] U.S. Cl. .......................... 260/45.75 M; 260/42.49
[58] Field of Search ..................... 260/45.75 M, 42.49; 428/920, 921

[56] References Cited

U.S. PATENT DOCUMENTS 4,053,452  10/1977  Kroenke ..................... 260/45.75 M

OTHER PUBLICATIONS

CA 62 (1965) 7962d.

*Primary Examiner*—V. P. Hoke
*Attorney, Agent, or Firm*—James R. Lindsay

[57] ABSTRACT

Smoke retardant vinyl chloride and vinylidene chloride polymer compositions are obtained by including cobaltous oxide (CoO) in the composition.

5 Claims, No Drawings

SMOKE RETARDANT VINYL CHLORIDE AND VINYLIDENE CHLORIDE POLYMER COMPOSITIONS

BACKGROUND OF THE INVENTION

Vinyl chloride and vinylidene chloride polymers are known to be self-extinguishing and relatively more flame retardant than other polymers such as polyethylene, polypropylene and the like. However, a substantial amount of smoke may be produced upon exposure of vinyl chloride and vinylidene chloride polymers to a flame. The fact that a polymer has good flame retardant properties does not necessarily mean that it will have good smoke retardant properties, as is well known to those skilled in the art.

U.S. Pat. No. 4,053,452 teaches the use of combinations of (A) melamine molybdate or substituted melamine molybdate and (B) cobaltous carbonate ($CoCO_3$) cobaltic oxide ($Co_2O_3$), cobalt (II) acetylacetonate, and cobalt (III) acetylacetonate and hydrates thereof as smoke retardant systems in vinyl chloride and vinylidene chloride polymer compositions. The patent, further, discloses that cobaltic oxide, as the sole smoke retardant, imparts some degree of improvement in the smoke retardation properties of vinyl chloride and vinylidene chloride polymer compositions, although the degree of protection is not as high as when the combination is used.

SUMMARY OF THE INVENTION

In the present invention, smoke retardant vinyl chloride and vinylidene chloride polymer compositions are obtained utilizing cobaltous oxide (CoO) as a smoke retardant additive. Cobaltous oxide imparts unexpectedly superior smoke retardant properties to vinyl chloride and vinylidene chloride polymer compositions in comparison to other oxides of cobalt (i.e., cobaltic oxide and cobalto-cobaltic oxide)

DETAILED DESCRIPTION OF THE INVENTION

Smoke retardant vinyl chloride and vinylidene chloride polymer compositions are obtained by including cobaltous oxide (cobalt monoxide) in the composition. The cobaltous oxide desirably has an average particle size from about 0.01 to about 800 microns, preferably from about 0.1 to about 100 microns, and is present in an amount from about 0.1 to about 20 parts by weight per 100 parts by weight of the vinyl chloride or vinylidene chloride polymer. If desired, one or more other smoke retardant additives for vinyl chloride and vinylidene chloride polymers may be added to the composition.

Vinyl chloride and vinylidene polymers used in this invention include homopolymers, copolymers and blends of homopolymers and/or copolymers. The vinyl chloride and vinylidene chloride polymers may contain from 0 to about 50 percent by weight of at least one other olefinically unsaturated monomer, more preferably from 0 to about 50 percent by weight of at least one other vinylidene monomer (i.e., a monomer containing at least one terminal $CH_2\!=\!C<$ group per molecule) copolymerized therewith, even more preferably from 0 to about 20 percent by weight of such vinylidene monomer. Suitable monomers include 1-olefins containing from 2 to 12 carbon atoms, more preferably from 2 to 8 carbon atoms, such as ethylene, propylene, 1-butene, isobutylene, 1-hexene, 4-methyl-1-pentene, and the like; dienes containing from 4 to 10 carbon atoms, including conjugated dienes such as butadiene, isoprene, piperylene, and the like; ethylidene norobornene and dicyclopentadiene; vinyl esters and allyl esters such as vinyl acetate, vinyl chloroacetate, vinyl propionate, vinyl laurate, alkyl acetate, and the like; vinyl aromatics such as styrene, α-methyl styrene, chlorostyrene, vinyl toluene, vinyl naphthalene, and the like; vinyl and allyl ethers and ketones such as vinyl methyl ether, allyl methyl ether, vinyl isobutyl ether, vinyl n-butyl ether, vinyl chloroethyl ether, methylvinyl ketone, and the like; vinyl nitriles such as acrylonitrile, methacrylonitrile, and the like; cyanoalkyl acrylates such as α-cyanomethyl acrylate, the α-, β- and γ-cyanopropyl acrylates, and the like; olefinically unsaturated carboxylic acids and esters thereof, including α,β-olefinically unsaturated acids and esters thereof such as methyl acrylate, ethyl acrylate, chloropropyl acrylate, butyl acrylate, hexyl acrylate, 2-ethylhexyl acrylate, dodecyl acrylate, octadecyl acrylate, cyclohexyl acrylate, phenyl acrylate, glycidyl acrylate, methoxyethyl acrylate, ethoxyethyl acrylate, hexylthioethyl acrylate, methyl methacrylate, ethyl methacrylate, butyl methacrylate, glycidyl methacrylate, and the like; and including esters of maleic and fumaric acid, and the like; amides of the α,β-olefinically unsaturated carboxylic acids such as acrylamide, and the like, divinyls, diacrylates and other polyfunctional monomers such as divinyl benzene, divinyl ether, diethylene glycol diacrylate, ethylene glycol dimethacrylate, methylene-bis-acrylamide, allyl pentaerythritol, and the like; and bis (β-haloalkyl) alkenyl phosphonates such as bis(β-chloroethyl) vinyl phosphonate, and the like.

More preferred monomers include 1-olefins containing from 2 to 12 carbon atoms, more preferably from 2 to 8 carbon atoms, such as ethylene, propylene, 1-butene, isobutylene, 1-hexene, 4-methyl-1-pentene, and the like; vinyl esters and allyl esters such as vinyl acetate, vinyl chloroacetate, vinyl propionate, vinyl laurate, allyl acetate, and the like; olefinically unsaturated carboxylic acids and esters thereof, including α,β-olefinically unsaturated acids and esters thereof such as methyl acrylate, ethyl acrylate, chloropropyl acrylate, butyl acrylate, hexyl acrylate, 2-ethylhexyl acrylate, dodecyl acrylate, octadecyl acrylate, cyclohexyl acrylate, phenyl acrylate, glycidyl acrylate, methoxyethyl acrylate, ethoxyethyl acrylate, hexylthioacrylate, methyl methacrylate, ethyl methacrylate, butyl methacrylate, glycidyl methacrylate, and the like, and including esters of maleic and fumaric acid, and the like; and amides of α,β-olefinically unsaturated carboxylic acids such as acrylamide, and the like.

The vinyl chloride and vinylidene chloride polymers may be prepared by any method known to the art such as by emulsion, suspension, bulk or solution polymerization. Compounding ingredients may be mixed with the polymer emulsion, suspension, solution or bulk mass before monomer removal and/or drying. More preferably compounding ingredients are mixed with dry granular or powdered polymers. The polymers and compounding ingredients may be mixed thoroughly in granular or powder form in apparatus such as a Henschel mixer, or the like. Alternatively, the mixing may be done while the polymer mass is fluxed, fused and masticated to homogeneity under fairly intensive shear in or on a mixer apparatus having its metal surface in contact with the material such as on a roll mill or within a mixer-extruder. The fusion temperature and time will vary according to the polymer composition and amounts of compounding ingredients present but generally will be in the range of about 150° to 200° C. and 2 to 10 minutes.

The vinyl chloride and vinylidene chloride polymer compositions of this invention may contain the usual compounding ingredients known to the art such as filler, stabilizers, opacifiers, lubricants, processing aids, impact modifiers, plasticizers, antioxidants, and the like.

Smoke retardancy may be measured using an NBS Smoke Chamber according to procedures described by Gross et al., "Method for Measuring Smoke from Burning Materials", *Symposium on Fire Test Methods—Restraint & Smoke* 1966, ASTM STP 422, pp. 166-204. Maximum smoke density (Dm) is a dimensionless number and has the advantage of representing a smoke density independent of chamber volume, specimen size or photometer path length, provided a consistent dimensional system is used. Percent smoke reduction is calculated using the equation:

$$\frac{Dm/g \text{ of sample} - Dm/g \text{ of control}}{Dm/g \text{ of control}} \times 100.$$

The term "Dm/g" means maximum smoke density per gram of sample. Dm and other aspects of the physical optics of light transmission through smoke are discussed fully in the ASTM publication.

Smoke retardance may be measured quickly using the Goodrich Smoke-Char Test. Test samples may be prepared by dry blending polymer resin and smoke retardant additives. The blend is ground in a liquid nitrogen-cooled grinder to assure uniform dispersion of the smoke retardant additive(s) in the resin. Small (about 0.3 g) samples of the polymer blend are pressed into pellets about ¼ inch in diameter for testing, alternately, test samples may be prepared by blending resin, smoke retardant additive(s) and lubricant(s) or processing aid(s) in a blender such as an Osterizer blender. The blend is milled, pressed into sheets, and cut into small (about 0.3 gram) samples for testing. The test samples are placed on a screen and burned for 60 seconds with a propane gas flame rising vertically from beneath the samples. Sample geometry at a constant weight has been found not to be significant for the small samples used in this test. A Bernz-O-Matic pencil flame burner head is used with gas pressure maintained at about 40 psig. Each sample is immersed totally and continuously in the flame. Smoke from the burning sample rises in a vertical chimney and passes through the light beam of a Model 407 Precision Wideband Photometer (Grace Electronics, Inc., Cleveland, Ohio) coupled with a photometer integrator. Smoke generation is measured as integrated area per gram of sample (SR/g).

The unexpected superiority of cobaltous oxide over other oxides of cobalt is illustrated by the following examples.

EXAMPLES 1-3

The following recipe was used:

| Material | Parts by Weight |
| --- | --- |
| Polyvinyl Chloride* | 100.0 |
| Additive (CoO, Co$_2$O$_3$ or Co$_3$O$_4$) | 10.0 |

*Homopolymer of vinyl chloride having an inherent viscosity of about 1.02; ASTM classification GP-5-15543.

Each experimental sample was prepared by dry blending the polyvinyl chloride polymer and additive. The blend then was ground in a liquid nitrogen-cooled grinder. Small samples (about 0.3 g) of the polymer blends were pressed into pellets about ¼ inch in diameter and were tested by the Goodrich Smoke-Char Test described heretofore. Test results are given in Table I.

TABLE I

| Example | Additive | % Char | SR/g* | Smoke Reduction % |
| --- | --- | --- | --- | --- |
| Control | — | 6.2 | 67.4 | — |
| 1 | CoO | 24.4 | 17.8 | 74 |
| 2 | Co$_2$O$_3$ | 20.8 | 31.0 | 54 |
| 3 | Co$_2$O$_4$ | 14.2 | 52.9 | 22 |

*SR/g = Intergrated area per gram of sample from smoke curve.

EXAMPLES 4-5

The following recipe was used:

| Material | Parts by Weight |
| --- | --- |
| polyvinyl Chloride* | 100.00 |
| Lubricant** | 1.5 |
| Additive (CoO or Co$_2$O$_3$) | 5.0 |

*Homopolymer of vinyl chloride having an inherent viscosity of about 1.02; ASTM classification GO-5-15543.
**A commercial polyethylene powder lubricant (Microthene 510).

The ingredients of the recipe were dry-mixed and banded on a two-roll mill for about 5 minutes at a roll temperature of about 160° C. The milled compositions were pressed into 6×6×0.050 inch sheets. Pressing was done at about 160° C. for five minutes using 40,000 pounds (about 14,900 Kg) of force applied to a 4-inch ram. The sample received a two minute preheat before being pressed.

The molded samples were cut into a 2⅞×2⅞×0.050 inch sections. Testing was performed using the flaming mode of the NBS Smoke Chamber Test (ASTM STP 422, pp. 166-204) described heretofore. Test results are given in Table II.

TABLE II

| Example | Additive | Dm/g* | Smoke Reduction % |
| --- | --- | --- | --- |
| Control | — | 68.6 | — |
| 4 | CoO | 25.1 | 63 |
| 5 | Co$_2$O$_3$ | 37.2 | 46 |

*Dm/g = Maximum smoke density per gram of sample.

EXAMPLES 6-7

| Material | Parts by Weight |
| --- | --- |
| Polyvinyl Chloride* | 100.0 |
| Lubricant | 2.0 |
| Dibutyltin dithioglycolate | 2.0 |

| Material | Parts by Weight |
| --- | --- |
| Additive (CoO or Co₃O₄) | 5.0 |

*Homopolymer of vinyl chloride having an inherent viscosity of about 1.02; ASTM classification GP-5-15543.
**A commercial polyethylene powder lubricant (Microthene 510).

The ingredients of the recipe were dry-mixed and banded on a two-mill roll for about 5 minutes at a roll temperature of about 160° C. After a two minute preheat, the milled samples were pressed into 6×6×0.050 inch sheets. Pressing was done at about 160° C. for five minutes using 40,000 pounds (about 14,900 Kg) of force applied to a 4-inch ram.

The molded samples were cut into ¼×¼×0.030 inch sections. Testing was performed using the Goodrich Smoke-Char Test described heretofore. Test results are given in Table III.

TABLE III

| Example | Additive | SR/g* | Smoke Reduction % |
| --- | --- | --- | --- |
| Control | — | 78.7 | — |
| 6 | CoO | 8.2 | 90 |
| 7 | Co₃O₄ | 31.5 | 60 |

*SR/g = Integrated area per gram of sample from smoke curve.

The improved smoke retardant vinyl chloride and vinylidene chloride polymer compositions of this invention are useful wherever smoke resistance is desirable, such as in carpets, house siding, plastic components for airplane and passenger car interiors, and the like.

I claim:

1. A smoke retardant composition consisting essentially of a vinyl chloride or vinylidene chloride polymer containing a predominant amount of vinyl chloride or vinylidene chloride together with a smoke retardant amount of cobaltous oxide (CoO).

2. A composition of claim 1 wherein said cobaltous oxide is present in an amount from 0.01 to about 20 parts by weight per 100 parts by weight of said polymer.

3. A composition of claims 1 and 2 wherein said polymer contains polymerized therewith from 0 to less than 50 percent by weight of at least one other olefinically unsaturated monomer.

4. A composition of claims 1 and 2 wherein said polymer contains copolymerized therewith from 0 to about 20 percent of said other olefinically unsaturated monomer.

5. A composition of claim 4 wherein said other monomer is selected from the group consisting of 1-olefins containing from 2 to 12 carbon atoms, vinyl esters, $\alpha,\beta$-olefinically unsaturated carboxylic acids and esters thereof, amides of $\alpha,\beta$-olefinically unsaturated carboxylic acids, and esters of fumaric and maleic acids.

* * * * *